(12) United States Patent
Cortegiano

(10) Patent No.: US 7,251,478 B2
(45) Date of Patent: *Jul. 31, 2007

(54) METHOD FOR ADVERTISING ON DIGITAL CELLULAR TELEPHONES AND REDUCING COSTS TO THE END USER

(75) Inventor: Mark L. Cortegiano, Middle Village, NY (US)

(73) Assignee: XcellaSave, Inc., MiddleVillage, NY (US)

( * ) Notice: Subject to any disclaimer, the term of this patent is extended or adjusted under 35 U.S.C. 154(b) by 46 days.

This patent is subject to a terminal disclaimer.

(21) Appl. No.: 11/186,702

(22) Filed: Jul. 21, 2005

(65) Prior Publication Data

US 2006/0094406 A1  May 4, 2006

Related U.S. Application Data

(63) Continuation-in-part of application No. 10/978,516, filed on Nov. 1, 2004.

(51) Int. Cl.
  *H04Q 7/22* (2006.01)
(52) U.S. Cl. .................... 455/412.1; 455/566
(58) Field of Classification Search ................ 455/406, 455/407, 3.01, 3.02, 3.03, 3.04, 433, 412.1, 455/412.2, 566; 370/331
See application file for complete search history.

(56) References Cited

U.S. PATENT DOCUMENTS

| | | | |
|---|---|---|---|
| 6,625,464 B1 * | 9/2003 | Bandy et al. ................ 455/503 |
| 6,883,000 B1 * | 4/2005 | Gropper ....................... 707/10 |
| 7,099,659 B1 * | 8/2006 | Schnake et al. ............. 455/419 |
| 7,123,947 B2 * | 10/2006 | Okagaki ...................... 455/566 |
| 7,174,191 B2 * | 2/2007 | Doble ......................... 455/563 |
| 2002/0032603 A1 * | 3/2002 | Yeiser ......................... 705/14 |
| 2002/0171691 A1 * | 11/2002 | Currans et al. ............. 345/864 |
| 2003/0003929 A1 * | 1/2003 | Himmel et al. ............. 455/466 |
| 2003/0037028 A1 * | 2/2003 | Akhteruzzaman et al. ..... 707/1 |
| 2005/0239446 A1 * | 10/2005 | Tagawa et al. .......... 455/414.1 |

* cited by examiner

*Primary Examiner*—Nick Corsaro
*Assistant Examiner*—Michael Faragalla
(74) *Attorney, Agent, or Firm*—Brooks, Cameron & Huebsch, PLLC

(57) ABSTRACT

The present invention relates to a method for displaying messages, such as advertisements, consumer promotions, and customer service announcements, on digital wireless communication devices, such as digital cellular telephones. The method comprising the steps of creating at least one display message in the form of an information file for display on a digital wireless communication device, valuating the at least one display message, transmitting the at least one display message to a database, transmitting the at least one display message from the database to the wireless communication device via a wireless communications network or system according to a predetermined schedule for display on the digital wireless communication device such that the display does not interfere with the operation of the digital wireless communication device, and applying the valuation of the at least one display message as credit to a user account associated with the digital wireless communication device.

44 Claims, 9 Drawing Sheets

Fig. 3  START-UP SEQUENCE

Fig. 5

| Power on | Power off | A1 | A2 | ⓘ | A3 | Power off | Power on | A4 | ⓘ | Power off | Power on | ⓘ | A5 | A6 | Power off | continued

| Power on | ⓘ | A7 | A8 | A9 | A10 | Power off | Power on | A1 | etc......... |

Fig. 6

| On | A1 | A2 | ⓘ | A3 | A4 | off | ON | A2 | ⓘ | A3 | A4 | A5 | A6 | off | On | A3 |

| A4 | A5 | A6 | A7 | A8 | A9 | off | ON | A4 | A5 | off | On | A6 | A7 | ⓘ | A7 |

| A4 | A7 | off | ON | A8 | A9 | ⓘ | A10 | off | ON | A9 | A10 | off | ON | A10 | A1 | ⓘ | A2 |

| off | ON | A1 |

Fig. 7

| 2/1/98 | On | A1 | A2 | A3 | off | on | A4 | ⓘ | A5 | A6 | off |
| --- | --- | --- | --- | --- | --- | --- | --- | --- | --- | --- | --- |
| 2/3/98 | On | A3 | A7 | | | | | | | | |

Scroll and Pause

Fade in, fade out.

METHOD FOR ADVERTISING ON DIGITAL CELLULAR TELEPHONES AND REDUCING COSTS TO THE END USER

This Application is a Continuation-in-Part of U.S. application Ser. No. 10/978,516, filed Nov. 1, 2004, the specification of which is included herein by reference.

FIELD OF THE INVENTION

This invention relates to a method for displaying messages such as advertisements over wireless communications networks, and particularly to digital cellular telephone services. This method provides a user with advertisement information that may be updated according to a flexible time schedule and that may be displayed in a number of different ways. This method also provides significant benefit to the user by lowering the net costs of the user, or providing discounts in the form of content for subscribing to the wireless service by shifting at least a portion of the costs of the user to the message originator, such as an advertiser. The method also provides the opportunity for branding exposure, promotional campaigns, information bulletins, and customer interactivity.

BACKGROUND OF THE INVENTION

Digital wireless communication services, such as Personal Communications Services ("PCS") and others, provide all the advantages of a traditional landline telephone plus all the conveniences of a cellular phone at a reduced cost in improved capability. PCS, for example operates in specific geographical areas and frequency bands established by government regulations. In this way, carriers are enabled to provide new specialized wireless or mobile services in specified geographic areas. PCS, for example, is a digital service wherein each carrier has a different array of antennas around the local area to provide service.

Digital wireless communication systems, such as PCS, offer the ability to customize service to meet the needs of the user. Such systems provide features not always available with analog cellular phones, including voice mail, Caller ID, call waiting, call forwarding, and paging. PCS and other digital wireless telephones can receive and display textual messages, and have a more sophisticated display capability than typical cellular telephones. It would be advantageous to utilize this greater display capability along with the specialized features associated with digital wireless communication systems, to provide an advertising system with the ability to transmit messages to a user in such a way that the user can receive the messages without interference with normal operation of the phone. The current invention provides such an information system.

It would be further advantageous to provide a business method incorporating the advertising system of the present invention to provide a reverse subscription method such that the value of the messages or advertisements displayed over the digital cellular telephone system offset the cost of the wireless communications service to the user. In one embodiment, the advertisers contribute to the cost of the user account in exchange for the right to display an advertising message on the user's digital telephone. In another embodiment, the user receives content or discounts on content from the advertisers or the wireless carriers in exchange for the right to display an advertising message on the user's digital telephone.

It would also be advantageous for wireless communication service providers, such as wireless carriers, mobile virtual network operators, and other wireless network operators, as well as other goods and services providers, to display information about particular services, brands, promotions, partnerships, future events, and other consumer or customer service information to particular customers.

SUMMARY OF THE INVENTION

The current invention provides a method for displaying messages and other desirable information, such as advertisements, promotions, branding, and other consumer and customer service information, over digital wireless communications devices, such as PCS and other digital telephones. The current invention changes the functionality of the existing hardware of a PCS or other wireless network to provide users with advertising information that is updated at the beginning of a specified time period or updated upon the occurrence of a specified event. The advertisements are consolidated onto a recording medium and transferred to a database, after which the information from the database is downloaded, via a wireless communication system into the memory of a digital telephone or other wireless communication device. The database is preferably the home location register of the wireless telephone, but may be an outside database connected to the home location register. When the telephone or other digital wireless communication device is powered on, the messages, preferably in the form of advertisements, brand information, promotional information, or other consumer or customer service information, are played for the user according to a chosen play sequence and display style. The advertisements, or other information, may be played in consecutive order or prioritized according to a predetermined priority scheme. The playing of the advertisements does not interfere with normal operation of the digital telephone or other wireless communication device, because the advertisements are preferably only played when the phone is on but not in use. The user may interact with the displayed advertisements by scrolling or toggling through the specified play list. Additionally, the user may connect directly to an advertiser either through a voice, data, or wireless Internet connection by activating a button, touch screen prompt, or other similar means.

The program necessary to display the downloaded advertisement information is preferably downloaded separately into the memory of the telephone. The operating cost to the user of the digital cellular telephone, typically the subscription account or service plan, is reduced, at least in part, by the value of the advertising displayed on the user's telephone. Or the user can receive content or discounts on content from a wireless carrier or from an advertiser. Alternatively, the user may receive promotional offers or other desirable information.

One embodiment of the current invention is a method for providing information to a wireless telephone user, comprising the steps of recording the information onto a recording medium; transferring the information from the recording medium to a database; and downloading the information, via a wireless communications system, from the database into a memory of the phone according to a time schedule; wherein when the phone is powered on, the information will be played for the user according to a specified play sequence and according to a specified display style, such that the displayed information does not interfere with normal use of the phone.

The recording medium may be at least one of a CD, DVD, tape, and diskettes, or other external memory device including hard drives and portable memory commonly know in the art. The database may be a home location register of the phone, or an outside database connected to a home location register of the phone. The time schedule is specified such that when the phone is first powered on during a specified time period, the information is downloaded into the phone's memory. The information preferably consists of at least one advertisement, but other information is contemplated In another embodiment of the current invention, the play sequence may be such that the advertisements, or other information, are played in sequential order; each advertisement is played for a specified time interval; the advertisements are not played during an interruption event; the advertisements are not played when the telephone is off; when the interruption event is over, the sequence resumes with the first advertisement not yet played; when the telephone is powered on again, the sequence resumes with the first advertisement not yet played; and after the last advertisement is played, the sequence returns to the beginning following a chosen time delay.

In another embodiment of the current invention, the play sequence is such that the advertisements, or other information, are played in sequential order; each advertisement is played for a specified time interval; the advertisements are not played during an interruption event; the advertisements are not played when the phone is off, when the interruption event is over, the sequence resumes with the first advertisement not yet played; when the phone is powered on again, the sequence resumes with the first advertisement not immediately played after power-up; and after the last advertisement is played, the sequence returns to the beginning following a chosen time delay.

In another embodiment of the current invention, the play sequence is such that one advertisement, or other information, is played until the phone is powered off, and a next advertisement is played when the phone is powered on again.

In yet another embodiment of the invention, and to facilitate power management and battery life, the play sequence is paused or temporarily terminated and no advertisement or other information is displayed on the device screen if an interruption event has not occurred within a specified or predetermined time period. The play sequence and display of the advertisement or other information on the screen of the device preferably resumes at the conclusion of the next interruption event.

Preferably each advertisement is played for a specified time interval. Furthermore, the advertisements, or other information, may be ranked in order of priority on a specified date, wherein the priority advertisements are played before the play sequence resumes on the specified date. Also, the current invention may provide that the advertisement is not marked as played until it is played for a specified time interval.

It will be appreciated that the play sequence and the duration that each advertisement, or other information, is played may depend on the nature of advertisement and the information contained therein. As such, one of skill in the art will understand that the play sequence may be varied according to the geographic location of the telephone or other digital communications device. The play sequence may also comprise a random ordered play, or multiple prioritized play sequences dependent on the time of day or day of week, the location of the telephone, the amount of usage of the phone, or the duration of time between interruption events. The play sequence may also be manipulated in such a manner that the user can toggle, fast-forward or rewind through the play sequence to find a particular advertisement or other information of interest.

The information may be displayed in at least one of audio form and visual form. The information displayed in visual form may be at least one of fixed images, moving or animated images, text images, graphical images, and digitized images.

An interruption event is a member of the group comprising a keypad input, a voice activation, a touch screen input, an incoming transmission, an outgoing transmission, any display initiated by the programming of the telephone or other wireless communication device associated with the operation of the telephone, turning the telephone on or off, and other similar functional events associated with the operation of the telephone and the like. The incoming transmission is a member of the group comprising a call, a voice mail message, an electronic mail message, a page, a stock quote, a Web cast or any other similar transmission type commonly associated with wireless communications systems.

In one embodiment of the current invention, the display style is such that an advertisement scrolls from the bottom of the display to the top of the display, and may pause near the middle of the display. In another embodiment, the display style is such that an advertisement scrolls from one side of the display to the other, and may pause near the middle of the display. In another embodiment, the advertisement fades into view and then fades out of view. In another embodiment, the display style is such that the advertisement blinks at least once.

Another embodiment of the current invention is a method for providing information to a wireless phone user, comprising the steps of powering on the phone; storing a current date in a memory of the phone; registering with a home location register; checking a user profile to detect an information file which contains at least one advertisement; opening and reading the information file: noting a start date and an end date of the information file; comparing the current date with the start and end dates; downloading the information file if it is the first time the user has powered on the phone after the start date; and initiating a play sequence for the information file according to a display style if the current date is after the start date and before the end date.

Yet another embodiment of the invention, provides a business method of offsetting costs to the end user of a wireless communications network by applying the monetary value to an advertiser of advertising messages displayed over a wireless phone to the end user account, thereby reducing the outstanding balance of the account.

In another embodiment of the invention, it provides a business method for a wireless carrier or the host of the enabling software to provide content or discounts on content to the users based on the revenue generated from the advertisements or other information. One of skill in the art will appreciate the broad scope of desirable content, such content including but not limited to, screensavers, coupons, music files, video files, ring tones, games, and the like.

A further embodiment of the invention, provides a business method for advertising or displaying other valuable or desirable information on digital wireless communication devices, comprising the steps: of creating at least one visual advertising message, branding image, promotional offer, or other consumer or customer service message, in the form of an information file for display on a digital telephone; valuating the at least one advertising message or other information; transmitting the at least one advertising message or other information to a database, wherein the database is in communication with networked wireless communication devices; transmitting the at least one visual advertising message or other information from the database to individual wireless communications devices, wherein the individual wireless communication device chosen for reception of the at least one advertising message contains necessary software for receiving and displaying the at least one advertising message or other information; electronically recording the date and time the at least one digital wireless communication device receives the at least one advertising message or other information; displaying the at least one advertising message or other information on the digital wireless communication device according to a predetermined schedule, wherein the display of the at least one advertising message or other information does not interfere with usability or functionality of the wireless communication device; and applying the valuation of the at least one advertising message or other information to a user account so as to adjust the outstanding monetary balance of the user account by the valuation amount.

Another embodiment of the invention is a business method that allows for individual users using the software enabling the advertisements or other information to be displayed on a wireless communication device to invite other potential users to download the software that enables the display of the advertising information and other information to the potential user's digital wireless device. Such invitation may be by text message, SMS, email, direct IR transmission, or any other method commonly known in the art.

BRIEF DESCRIPTION OF THE FIGURES

FIG. 5 illustrates a play sequence according to another embodiment of the current invention;

FIG. 6 illustrates a play sequence according to another embodiment of the current invention;

FIG. 7 illustrates a play sequence according to another embodiment of the current invention;

DETAILED DESCRIPTION OF THE INVENTION

In general, this invention provides a method for advertising or displaying other valuable or desirable information over digital wireless communications devices, such as PCS telephones, whereby advertisement information, or other suitable information, is downloaded to a portable wireless communication device, such as a PCS telephone and preferably temporarily stored in the telephone's memory. When the phone is activated, the advertisement or other information may be played for the user in a number of different ways. The advertisement or other information preferably disappears from the display upon the occurrence of certain events, including when the user powers down the phone, activates the keypad or touch screen, utilizes a voice activation command, receives an incoming transmission or initiates an outgoing transmission, such as a telephone call, text message, SMS, Web browsing, email, or the like. Alternatively, the advertisement or other information may also be displayed in any manner such that the advertisement or other information does not interfere with the operability of the communications devices, i.e., the advertisement is passive to certain events, including when the user powers down the communications device, activates the keypad or touch screen, initiates a voice activation command, receives an incoming transmission, or initiates an outgoing transmission, or the like.

Figure 1:
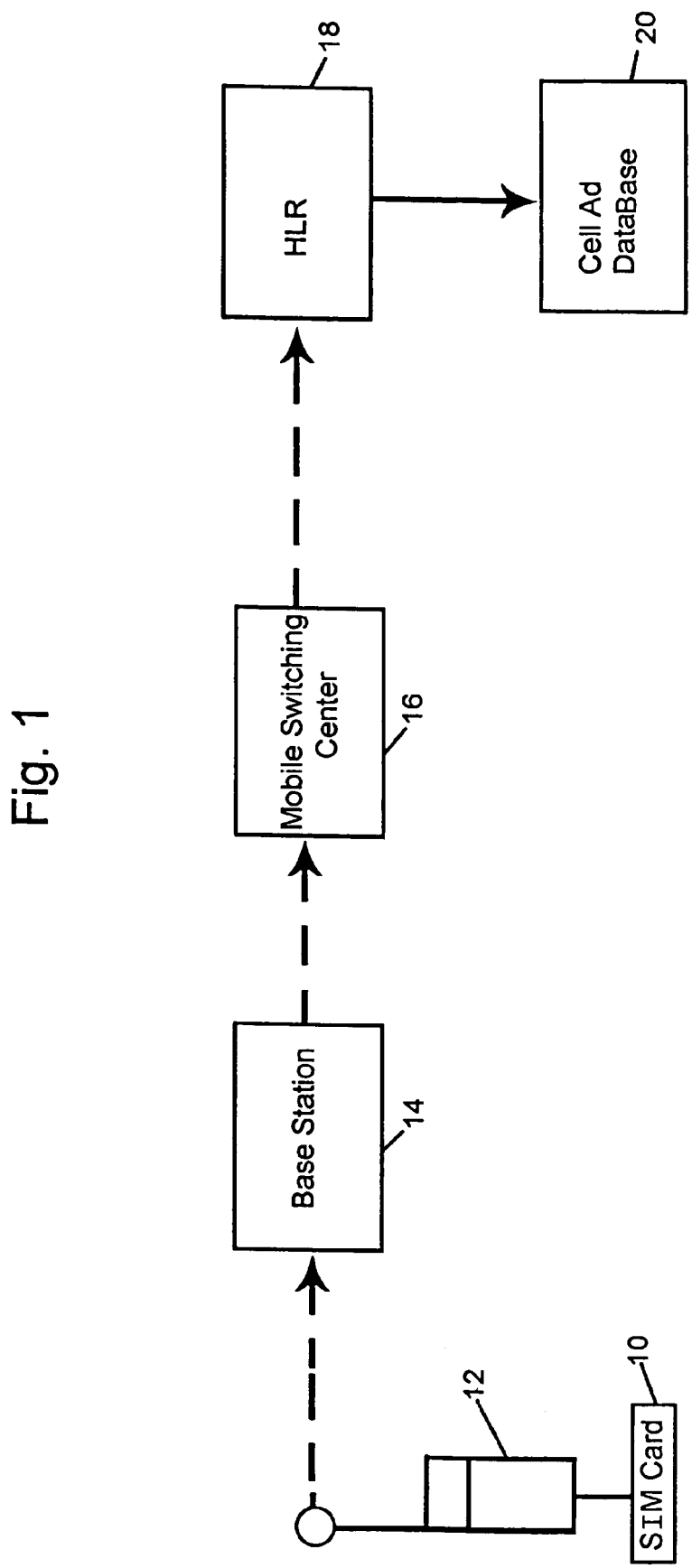
FIG. 1 is a block diagram of a standard PCS telephone network.

FIG. 1 shows a block diagram of a standard PCS telephone network. Included in the network is a subscriber identity module ("SIM") card 10, a PCS terminal 12, a base station 14, a mobile switching center 16, a home location register ("HLR") 18, and a cellular advertisement database 20.

The SIM card 10 is a removable card that stores important subscriber/user information, such as identification numbers, details of the user's service plan, and abbreviated dialing codes selected by the user. The SIM card is the users link to the PCS system. By removing the SIM card, the user disables the telephone, except perhaps for the ability to make emergency calls. To change telephones, the user may simply move the SIM card from one telephone to another. In this way, the user may use the new phone while retaining his or her own telephone number and specialized calling features. Additional subscriber identification technology known in the art is also contemplated in the present invention.

The base station 14 is a stationary collection of equipment that communicates by radio with nearby PCS phones. The geographical area covered by a base station is known as a "cell." The home location register 18 is a database that typically contains subscription information such as recorded information about the terminal's current location and status. In typical operation, a call request for a terminal 12 arrives at the terminal's mobile switching center 16, which then interrogates the terminal's home location register 18 in order to determine the location of the terminal 12.

In accordance with one aspect of the current invention, the home location register 18 preferably also acts as a database for storing advertisement information or other desirable information, before the information is downloaded to the telephone's memory, preferably the random access memory ("RAM"). Flash memory, EEPROPM, EPROM, ROM, SRAM, DRAM and other forms of memory may be used. Alternatively, the database may be a cellular advertisement database 20 outside the wireless network that is in electronic communication with the home location register 18, whereby the advertisement information may be delivered to the home location register 18 by disk, or other recording medium known in the art, or direct transmission. By utilizing the home location register 18 in this way, there is no need to alter the PCS hardware to insert the advertisements in order to implement the current invention. Moreover, the program necessary to display the downloaded advertisement information is also downloaded separately into the phone's memory. This results in an inexpensive method that requires no action by the user.

Figure 2:
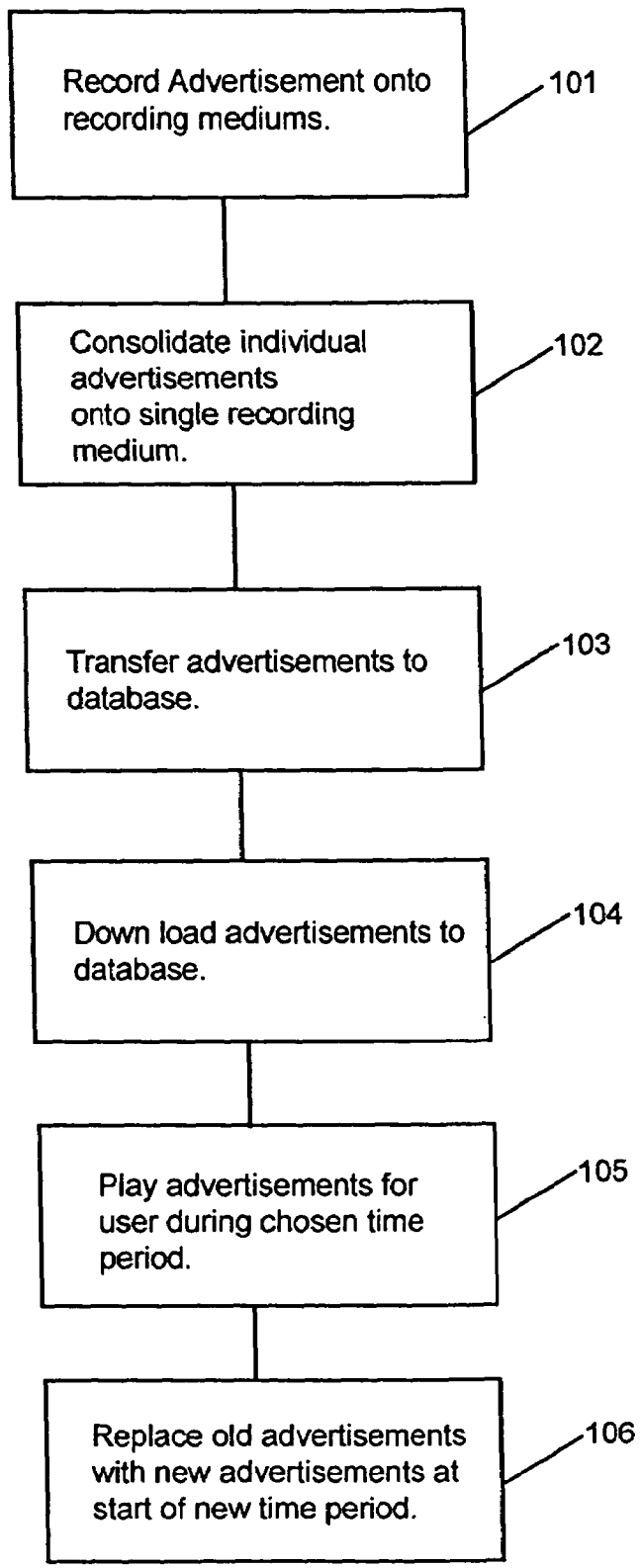
FIG. 2 is a flowchart of a method of advertising over PCS telephones according to one embodiment of the current invention.

FIG. 2 is a flowchart of a method of advertising over PCS telephones according to one embodiment of the current invention. In Step 101, advertising information from various providers is recorded and stored onto a recording medium such as a compact disc ("CD"), digital video disc ("DVD"), diskette, tape, external drive, or any other appropriate medium. In Step 102, the individual advertisements are consolidated onto a single recording medium if necessary. In Step 103, the information from the recording medium is transferred as a group to a database. In Step 104, the information from the database is downloaded via a wireless communications network into the telephone's RAM. This occurs according to a specified time schedule, such as the first time the user powers on the telephone for the month. The information is stored in the RAM for a specified time period, such as one month, and replayed in Step 105 until it is replaced by new downloaded information in Step 106.

Figure 3:
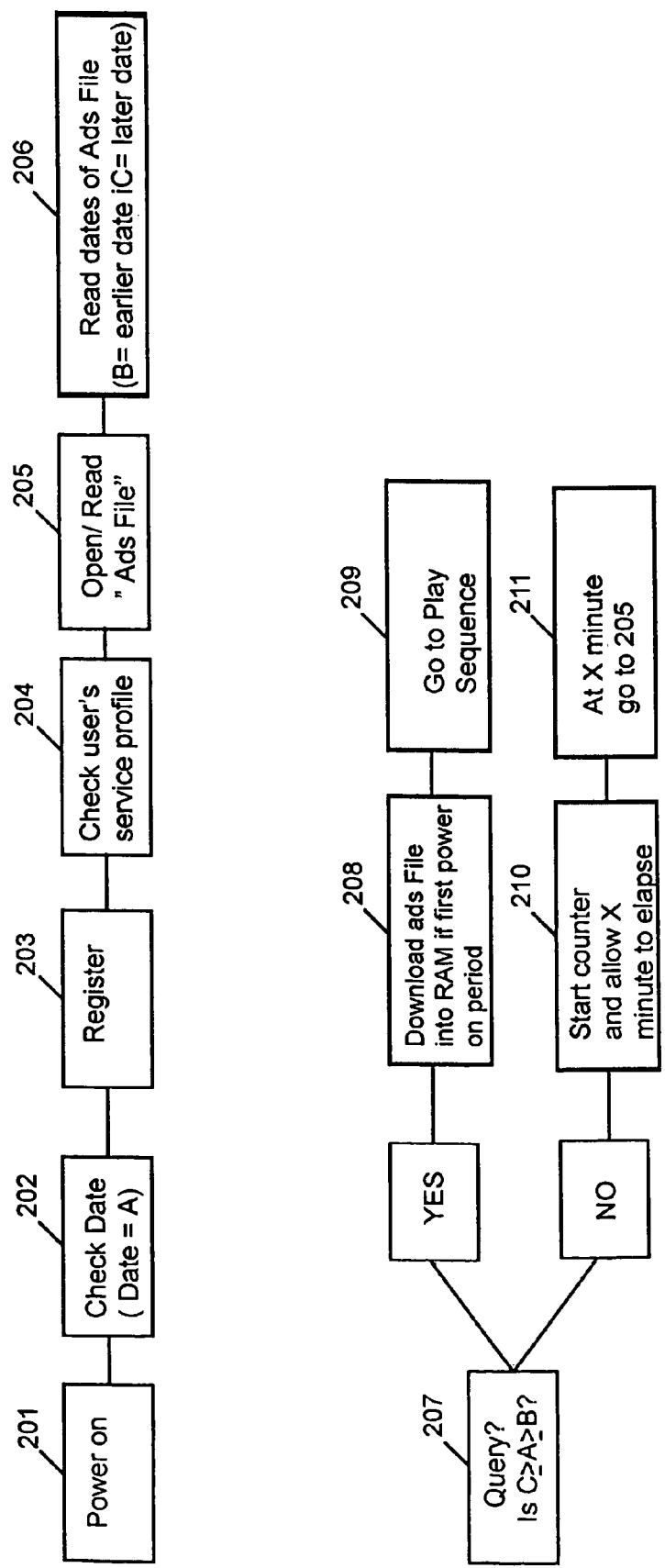
FIG. 3 is a flowchart of the start-up sequence of a PCS terminal 12 according to one embodiment of the current invention.

FIG. 3 is a flowchart of the start-up sequence of a PCS terminal 12 according to one embodiment of the current invention. The phone is powered on by the user in Step 201. In Step 202, the phone stores the current date in the RAM as "A" so that it may later retrieve the date for comparison with the advertising period. The phone then registers with the home location register 18 in Step 203, per standard procedure. In Step 204, the home location register 18 checks the user's service profile to determine which services the user has available to the users terminal. At this point, according to one aspect of the current invention, the home location register 18 preferably detects the Ads File in the user's profile, which is the file that stores the advertisement data. Step 205 opens and reads the Ads File, and Step 206 notes the date that the Ads File is set to begin ("B") along with the date that the Ads File expires ("C"). In Step 207, the home location register 18 compares the current date with the dates of the advertising period to determine whether it is within the time period during which the ads file is to be played. If it is the first time that the user has powered on the PCS phone during the advertising period, then Step 208 directs the home location register 18 to download the Ads File into the memory of the phone. If the Ads File is to be played, the play sequence is initiated by Step 209. Otherwise, Step 210 counts until a specified number of minutes elapses, at which point the program returns to Step 205.

The Ads File is preferably located in a part of the memory where it can be replaced periodically, but will not be lost when the phone is powered off. The Ads File preferably should have REM statements at the beginning which indicate the dates of use and even name the period as a whole (e.g., "B"=10/1/2004; "C"=10/31/2004; Period=October) and should preferably also include numbered markers which indicate the order of the ads.

Figure 4:
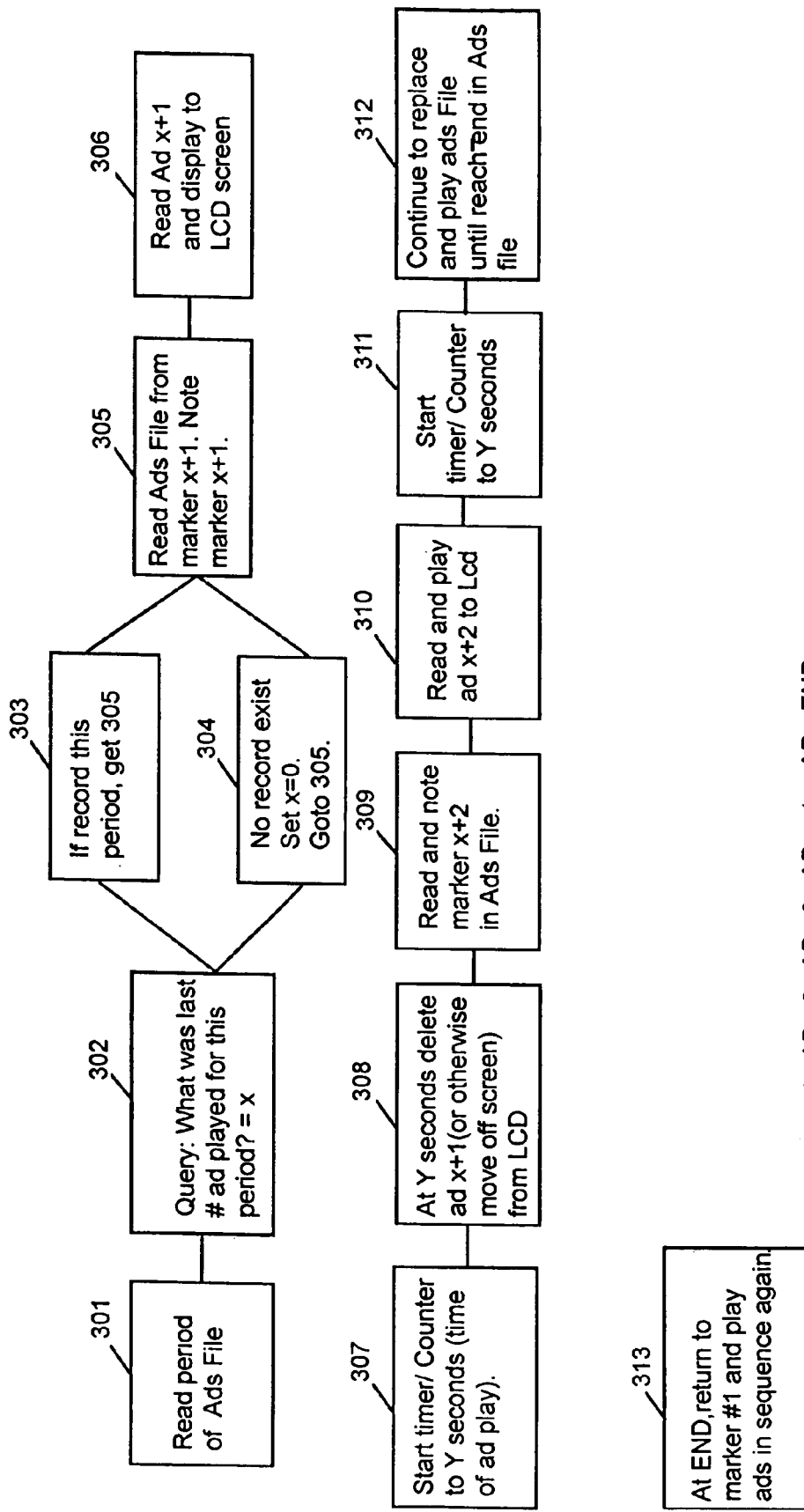
FIG. 4 is a flowchart of a play sequence according to one embodiment of the current invention.

FIG. 4 is a flowchart of a play sequence according to one embodiment of the current invention.

In FIG. 4, the advertisements are chosen to be played consecutively. It should be noted, however, that the play sequence may be altered in whatever way the advertiser desires. For example, ad # 1 could remain playing until the phone is powered off, and ad #2 could begin playing when the phone is powered on again. Moreover, the sequence could be altered to play certain ads more than once. Also, the timing may be altered in whatever way necessary. FIG. 4 is illustrative of the basic steps in replaying a series of advertisements in a predetermined order. Those of skill in the art will appreciate that any predetermined order may be chosen.

In Step 301, the time period of the Ads File is read. The time period is the length of time the ads will be played. For example, the ads could be chosen to play during the month of December. It should be appreciated that the time period for which the ads is largely variable on the content of the advertisement. In Step 302, a query determines the last numbered ad played during the designated period and sets variable X equal to that number. If no record exists of an ad having been played during this period, X will be set to zero in Step 304. Step 305 reads the Ads File starting from marker X+1 and notes that marker. Step 306 reads ad number X+1 and plays it to the LCD screen. Step 307 determines the length of time Y that the ad will be played by starting the timer and setting the counter to Y seconds. After Y seconds, Step 308 deletes ad number X+1 from the screen. Step 309 reads and notes the next marker X+2 in the Ads File. Step 310 reads ad number X+2 and displays it on the screen. Step 311 starts the timer and sets the counter to Y seconds. The process continues in Step 312 until the end of the Ads File is reached, at which point Step 313 returns to the first marker and plays the ads in sequence again.

The method of advertising according to the current invention is preferably implemented in such a way that the advertisements do not interfere with the normal operation of the digital wireless communication device, such as a PCS phone. Each time an advertisement is played for a user, the playback will continue until an interruption event occurs. An interruption event is any event which is a normal function of the digital wireless communication device. The advertisement information may be interrupted by such an event when the telephone is commanded through the keypad input to take action, such as place an outgoing call or when the telephone receives an incoming transmission, such as a call, voicemail, e-mail, page, stock quote, or the like. If an interruption event occurs, the advertisement preferably should cease to be displayed on the LCD screen or other display known in the art, and the marker and time elapsed should be noted. Once the interruption event is over, the previous ad may resume for the time remaining in the play, or the advertiser may choose that the next ad be played.

Alternatively, in order to facilitate power management and battery life, the display of the advertisement or other information may be temporarily paused or terminated should the telephone or other wireless device be powered on and an interruption event has not occurred within a specified or designated time period. At the conclusion of the next interruption event occurring after such temporary display termination, the display sequence and display of the advertisement or other information preferably resumes in accordance with the methods of the present invention.

The advertisement information may be played according to a chosen or specified play sequence. FIG. 5 illustrates one such play sequence in accordance with one embodiment of the current invention. In this embodiment, the advertisements are played in sequential order according to a specified time period until an interruption event occurs or the telephone is powered off. When the interruption event is over or the telephone is powered on again, the screen resumes displaying the advertisements in sequential order. After all of the advertisements are played, the program starts over from the first advertisement. FIG. 5 assumes ten different advertisements, represented by A1 to A10. When the telephone is first powered on for the month, the advertisement information is downloaded into the RAM. Subsequently, the first advertisement (A1) is played for the user. After a specified time interval, and if no interruption event has occurred, the telephone will display A2. When an interruption event ("I") occurs, the advertisements will cease to be played and the RAM will note where it is in the sequence. When the interruption event is over, the screen displays A3.

After the telephone is powered off and then powered on again at a subsequent time, A4 will be played. The sequence continues in this order and then repeats after each cycle is over.

FIG. 6 Illustrates a play sequence that may be implemented according to another embodiment of the current invention. In this embodiment, the advertisements are played in sequential order, and if an interrupt event occurs, the order is continued from where it left off just as before. If the phone is powered down, however, upon power-up the sequence begins with the firm advertisement that was not initially displayed at power-up. In this way, each advertisement has the opportunity to be played immediately after power-up in order to gain exposure to the user during the time at which the user may most likely be looking at the phone. Thus, in the example shown in FIG. 6, the phone is powered on and A1 is played, followed by A2. After the interruption event occurs, the advertisements continue to be played in sequential order beginning with A3. Once the phone is powered off after A4 and then powered on again at a subsequent time, the sequence begins with A2, as A2 represents the first advertisement in the sequence which was not initially displayed at power-up. After the last advertisement has a chance to be initially displayed, the sequence starts over.

Figure 7:
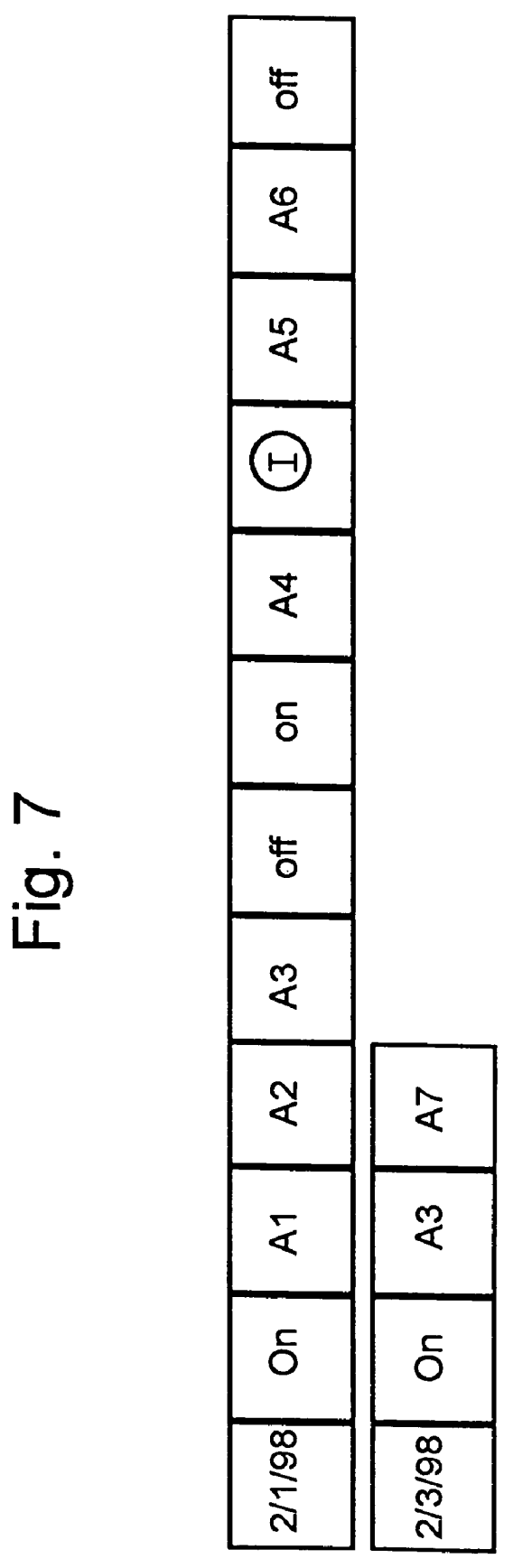

There are additional features that may be utilized with the current invention, including with the embodiments disclosed in FIGS. 5 and 6. In one embodiment, priority may be given to certain advertisements on certain dates. This requires the program to check the date at power-on and then check to see whether any advertisements are designated for that date. The priority advertisement would then be played before the sequence is resumed. FIG. 7 illustrates this embodiment of the current invention. A3 is designated as a priority advertisement on the date of Feb. 3, 1998. On February 1, the phone is powered on and the sequence plays A1, A2, and A4 in sequential order. The following day, upon being powered on the phone resumes with the next advertisement in the sequence, A4. After an interruption event occurs, A5 and A6 are displayed, followed by power-off.

When the phone is powered on February 3, the program, performing its daily check for priority advertisements, discovers that A3 is a priority advertisement for that day. The program then plays A3, followed by a return to the normal sequential order by playing A7.

Another feature of the current invention is that an ad is not marked as played until it has been displayed for a specific time interval. If the advertisement has not been played for the full time interval, the program will treat it as not having been played at all, and the sequence will resume with that advertisement.

The advertising information is displayed on the phone's screen, and may be displayed in audio form, visual form, or a combination of both. Information in visual form may be displayed as fixed images, moving, or animated images. In one embodiment of the invention, the advertising information is a fixed image that displays a logo, trademark, or slogan. Also displayed may be the telephone number or email address of the advertising company. Another embodiment of the invention includes moving images or sound as the advertising information, as well as digitized images.

Figure 8:
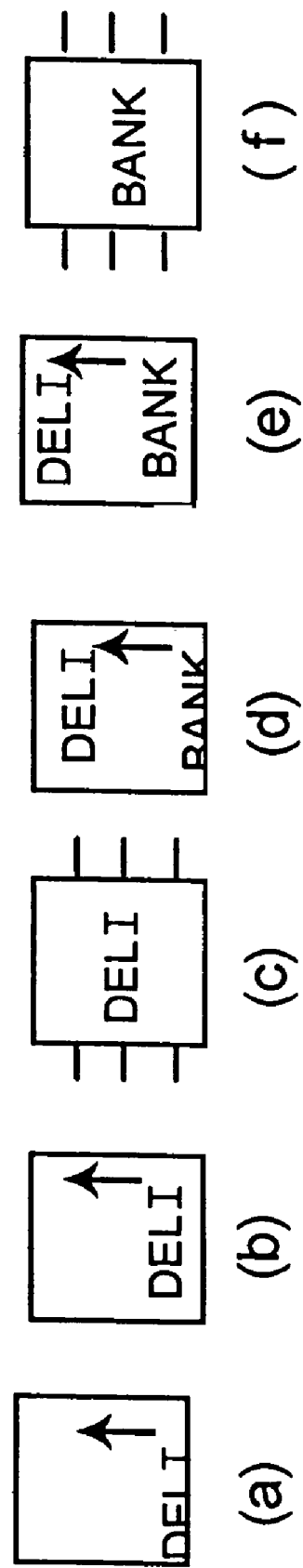
FIG. 8 illustrates the "scroll and pause" display style according to one embodiment of the current invention.

There are several possible display styles which dictate how a particular advertisement is to be displayed on the screen. FIG. 8 shows one embodiment according to the current invention, whereby the advertising information is displayed in a "scroll and pause" style. In this style, an advertisement starts off the screen and scrolls to the middle of the screen, where it pauses for a specified time interval and then continues to scroll until it is off the screen. In (a) of FIG. 8 is a snapshot of the partial image of an advertisement as it begins to appear on the screen. In (b), the advertisement is shown scrolling towards the middle of the screen in order to be displayed in full as shown in (c). (d) is a snapshot of the screen as the advertisement is scrolling off and a new advertisement is scrolling on. In (e) and (f), the process continues until the new advertisement is displayed in full. Variables that may be altered in this display method include the scrolling speed and the length of time that the advertisement remains on full display in the middle of the screen.

Figure 9:
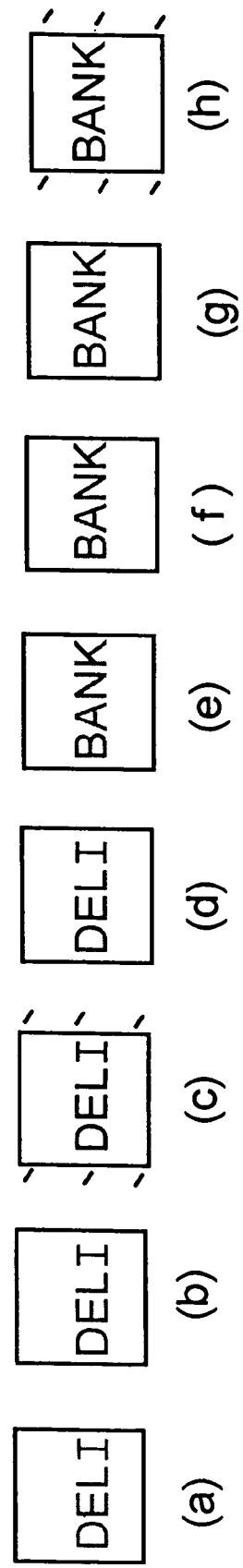
FIG. 9 illustrates the "fade in, fade out" display style according to another embodiment of the current invention.

FIG. 9 shows another embodiment of the current invention whereby the advertising information is displayed in a "fade in, fade out" style. Views (a) and (b) in FIG. 9 show the advertisement as it is fading in. View (c) shows the advertisement in loll display for a specified time interval. (d) and (e) show the advertisement fading out, whereupon the sequence repeats with a new advertisement in (f), (g), and (h).

Other embodiments of the current invention are envisioned that incorporate display styles known in the art, such as a "blinking" style. In this style, the display blinks with different advertisements each time the information appears on the screen. The advertiser may choose to vary the parameters of the display, for example, by setting time lengths regarding how long an advertisement remains on the screen before being deleted and replaced with another advertisement. Additionally, it will be appreciated that the intensity of the display may be varied in order to achieve a desirable and efficient energy consumption.

It is further contemplated that the user may alternatively manipulate the display by scrolling forward and backward, toggling, fast forwarding and rewinding through the displayed advertisements by activating a button on the wireless device, activating a touch screen, using voice recognition, or similarly known user controlled prompts.

Preferably, the user may choose to interact with any one advertisement by connecting to the advertiser's sponsor via a wireless telephone connection or a wireless Internet connection. Activation of such connection is made by the user by activating a button on the wireless device, activating a touch screen, using voice recognition, or similarly known user controlled prompts. Nothing prevents the user from interacting with more than one advertiser but the invention only contemplates one interaction at a time.

Another embodiment of the invention is directed to a method for advertising or providing other content on a digital wireless communication device such as a PCS telephone. While the example of advertising is used to explain this embodiment, it is understood that this embodiment could be used with other desirable information. The method adds significant value to the end user by reducing the cost of the communication device, typically a subscription or service plan with a network provider. The method reduces the cost of the user's subscription with the network provider by the valuation of the advertising that the user allows to be displayed on the users wireless communication device. The method of this embodiment preferably begins by creating at least one visual advertising message in the form of an information file for display on a digital telephone. Next a monetary value is preferably established for displaying the at least one advertising message on the digital wireless communication device over a period of time. The at least one visual advertising message is then transmitted via suitable transmission means to a central database. The database is preferably the home location register of the communication device, as is typically found in PCS systems. It will be appreciated that the database is in communication with a networked wireless communication system, of which the wireless communication devices, such as the PCS phone, are compatible with and preferably a part of.

The at least one advertising message may be transmitted to the data base as an individual data file or may alternatively be combined with other advertising messages to increase efficiency of transmission to the database. Once the advertising message or messages have been transmitted to the database, the database then transmits the advertising message or messages to individual wireless communication devices that have been configured with the necessary software to receive and display the advertising message or messages. Transmission of the advertising message or messages to the wireless communication devices is preferably performed according to a predetermined schedule. Those of skill in the art will appreciate that the schedule may be dynamic and irregular, but nonetheless, establishes the transmission criteria for transmission of the advertising message or messages to the individual wireless communication device, such as a PCS terminal. Moreover, transmission of the advertising message or messages, or other desirable information, may be targeted to specific participating wireless devices according to established or preferred demographics, location, service plan, device model, user profile, or the like.

After transmission of the advertising message from the database to the individual communication device, the date and time of the transmission are electronically recorded and receipt of the advertising message by the individual communication device is confirmed. The advertising message or messages are then preferably stored in the RAM of the individual communication device and are displayed according to a predetermined schedule, according to a predetermined prioritization scheme, or alternatively the display schedule or sequence may be transmitted with the advertising message or messages. It will be appreciated that the predetermined display schedule may comprise designators associated with any particular advertising message and a program, previously loaded and stored on the individual communication device to recognize and rank order the designator associated with each advertising message transmitted.

The individual wireless communication device then displays the advertising message or messages according to the hierarchy of designators established in the display programming previously loaded onto the communication device. The display of the advertising message preferably does not interfere with the operability or functionality of the communication device and is most preferably passive to an interruption event.

The display sequence of the advertising messages is preferably continued for a designated period of time, such as one month, one week, or ten days, or any other period appropriate for the content and advertisements displayed. The display period for each advertising method may coincide or be coordinated with the billing cycle of the wireless communication system provider.

Preferably, after completion of at least one play sequence the user may manipulate the display of the advertisement by scrolling, toggling, advancing, fast forwarding or rewinding through the sequence of advertisements to find any one particular advertisement of interest. Such scrolling, advancing or rewinding may be accomplished by any means known in the art, including by activating a button on the wireless device, activating a touch screen, using voice recognition, or a similarly known user controlled prompt.

Preferably, the user may interact with a particular advertisement of interest by connecting to an advertisers sponsor by making a wireless telephone call, sending a text message, or connecting to the sponsor's Web page via a wireless Internet connection. The user may choose a preferred or default method of connecting to an advertisement sponsor. Alternatively, the host software downloaded to the cellular telephone that enables the cellular telephone to display the content or advertisements according to the specified order, may detect whether an Internet connection is available, and default to a wireless telephone connection if the Internet connection is not available. Alternatively, the host software downloaded to the cellular telephone that enables the cellular telephone to display the content or advertisements according to the specified order, may detect whether a wireless telephone connection is available, and default to a wireless Internet connection if the telephone connection is not available. The preferred default for the users interaction with the advertisement may also be determined and fixed by the advertising sponsor.

Finally, the valuation method of one embodiment of the invention, applies the valuation of the advertising method to the operating cost of the individual communication device, typically a subscription account or service plan. By applying the valuation of the advertising message to the user's subscription account, this method preferably reduces the cost to the user of operating the wireless communication device.

As stated before, this invention also provides for a method of business where the advertiser, host, or wireless carrier provides content or a discount on content to the user for the right to display the at least one advertisement.

Another embodiment of the invention is a method that allows individual users using the software enabling the advertisements to be displayed on a wireless communication device to transfer or send the software to other potentional users using their wireless communication device. The software may be transferred by anyone of many means already well known in the art including a text message, email, Web invitation, and an infrared transmission.

The above invention has been described with specific embodiments, but a person skilled in the art could introduce many variations on these embodiments without departing from the spirit of the disclosure or from the scope of the appended claims. The embodiments are presented for the purpose of illustration only and should not be read as limiting the invention or its application. Therefore, the claims should be interpreted commensurate with the spirit and scope of the invention.

I claim:

1. A method for providing information for display to a wireless communication device, comprising the steps of:
    creating information for display on the wireless communication device, wherein the wireless communication device includes memory for storing information and a display;
    recording the information onto a recording medium;
    tranferring the information from the recording medium to a database, wherein the database is in communication with a wireless communication network;
    downloading the information from the database, via the wireless communication network, into the memory of the wireless communication device according to a predetermined schedule;

displaying the information on the display of the wireless communication device according to a specified play sequence, wherein displaying the information does not interfere with the normal use of the communication device;

displaying the information on the display of the wireless communication device by displaying a first display message of a display sequence at power-up of the communication device and displaying a different display message of the display sequence at a subsequent power-up of the communication device for a specified period of time; and displaying the information on the display of the wireless communication device in one or more frames that allows navigation through said frames.

2. The method for providing information for display to a wireless communication device of claim 1, including the step of providing the information as at least one advertisement to be displayed for a specified time interval.

3. The method for providing information for display to a wireless communication device of claim 1, wherein navigating through the frames is accomplished by scrolling through the frames.

4. The method for providing information for display to a wireless communication device of claim 1, wherein navigating through the frames is accomplished by toggling through the frames.

5. The method for providing information for display to a wireless communication device of claim 1, wherein navigation through the frames is accomplished by pushing one or more buttons.

6. The method for providing information for display to a wireless communication device of claim 1, wherein navigation through the frames is accomplished by voice recognition.

7. The method for providing information for display to a wireless communication device of claim 1, wherein navigation through the frames is accomplished touching the display in one or more locations.

8. The method for providing information for display to a wireless communication device of claim 1, wherein navigation through the frames is accomplished one frame at a time.

9. The method for providing information for display to a wireless communication device of claim 8, wherein navigation through the frames is accomplished by pushing one or 20 more buttons.

10. The method for providing information for display to a wireless communication device of claim 8, wherein navigation through the frames is accomplished by voice recognition.

11. The method for providing information for display to a wireless communication device of claim 8, wherein navigation through the frames is accomplished touching the display in one or more locations.

12. The method for providing information for display to a wireless communication device of claim 1, wherein navigation through the display information is accomplished by fast-forwarding though the information.

13. The method for providing information for display to a wireless communication device of claim 12, wherein navigation through the frames is accomplished by voice recognition.

14. The method for providing information for display to a wireless communication device of claim 12, wherein navigation through the frames is accomplished touching the display in one or more locations.

15. The method for providing information for display to a wireless communication device of claim 2, comprising the step of providing the play sequence so that: the at least one advertisement is played in specified order;

the at least one advertisement is played for a specified time interval and period; and the at least one advertisement is displayed without interfering with the normal operation of the phone.

16. The method for providing information for display to a wireless communication device of claim 2, comprising the step of providing a display sequence so that:

the at least one advertisement is not played during an interruption event;

the display sequence resumes at the termination of an interruption event.

17. The method for providing information for display to a wireless communication device of claim 2, comprising the step of providing a display sequence so that:

the at least one advertisement is not displayed when the wireless communication device is off;

the display sequence resumes with the next specified advertisement upon activation of the wireless communication device; and after the last advertisement of a display sequence is played, the display sequence repeats with the first specified at least one advertisement.

18. The method for providing information for display to a wireless communication device of claim 2, farther comprising the step of marking the advertisement as played only after the advertisement is displayed for a specified time interval.

19. The method for providing information for display to a wireless communication device of claim 1, including displaying the information in at least one of an audio form and a visual form.

20. A method for providing information for display to a wireless communication device, comprising the steps of:

creating at least one display message in the form of an information file;

valuating the at least one display message;

transmitting the at least one display message to a database, wherein the database is in communication with a wireless communication network; transmitting, via the wireless communication network, the at least one display message from the database to at least one wireless communications device, wherein the at least one wireless communication device includes memory for storing the at least one display message and a display;

displaying the at least one display message according to a specified order for a specified period of time; wherein the display of the at least one display message does not interfere with the normal use of the wireless communication device;

displaying the information on the display of the wireless communication device by displaying a first display message of a display sequence at power-up of the communication device and displaying a different display message of the display sequence at a subsequent power-up of the communication device for a specified period of time;

displaying the at least one display message in one or more frames that allows navigation through said frames; and applying the valuation of the at least one advertising message to a user account so as to adjust the outstanding monetary balance of the user account by the valuation amount of the at least one display message.

21. The method for providing information for display to a wireless communication device of claim 20, comprising the step of providing a display sequence so that:
  the at least one display message is not played during an interruption event;
  the display sequence resumes at the termination of an interruption event.

22. The method for providing information for display to a wireless communication device of claim 20, comprising the step of providing a display sequence so that:
  the at least one display message is not displayed when the wireless communication device is off;
  the display sequence resumes with the next specified display message upon activation of the wireless communication device; and
  after the last display message of a display sequence is played, the display sequence repeats with the first specified display message.

23. The method for providing information for display to a wireless communication device of claim 20, including displaying the information in at least one of an audio form and a visual form.

24. A method for providing information for display to a wireless communication device, comprising the steps of:
  creating at least one display message in the form of an information file;
  valuating the at least one display message;
  transmitting the at least one display message to a database, wherein the database is in communication with a wireless communication network;
  transmitting, via the wireless communication network, the at least one display message from the database to at least one wireless communications device, wherein the at least one wireless communication device includes memory for storing the at least one display message and a display;
  displaying the at least one display message according to a specified order for a specified period of time; wherein the display of the at least one display message does not interfere with the normal use of the wireless communication device;
  displaying the information on the display of the wireless communication device by displaying a first display message of a display sequence at power-up of the communication device and displaying a different display message of the display sequence at a subsequent power-up of the communication device for a specified period of time;
  displaying the at least one display message on the display of the wireless communication device in one or more frames that allows navigation through said frames; and
  crediting a user account with the valuation of the at least one advertising message.

25. The method for providing information for display to a wireless communication device of claim 24, comprising the step of providing a display sequence so that:
  the at least one display message is not played during an interruption event;
  the display sequence resumes at the termination of an interruption event.

26. The method for providing information for display to a wireless communication device of claim 24, comprising the step of providing a display sequence so that:
  the at least one display message is not displayed when the wireless communication device is off;
  the display sequence resumes with the next specified display message upon activation of the wireless communication device; and
  after the last display message of a display sequence is played, the display sequence repeats with the first specified display message.

27. The method for providing information for display to a wireless communication device of claim 24, including displaying the information in at least one of an audio form and a visual form.

28. A method for providing information for display to a wireless communication device, comprising the steps of:
  creating at least one display message in the form of an information file;
  valuating the at least one display message;
  transmitting the at least one display message to a database, wherein the database is in communication with a wireless communication network;
  transmitting, via the wireless communication network, the at least one display message from the database to at least one wireless communications device, wherein the at least one wireless communication device includes memory for storing the at least one display message and a display;
  displaying the at least one display message according to a specified order for a specified period of time; wherein the display of the at least one display message does not interfere with the normal use of the wireless communication device;
  displaying the information on the display of the wireless communication device by displaying a first display message of a display sequence at power-up of the communication device and displaying a different display message of the display sequence at a subsequent power-up of the communication device for a specified period of time;
  displaying the at least one display message on the display of the wireless communication device in one or more frames that allows navigation through said frames; and
  providing content or a discount on content to a user based on the valuation of the at least one advertising message.

29. The method for providing information for display to a wireless communication device of claim 28, comprising the step of providing a display sequence so that:
  the at least one display message is not played during an interruption event;
  the display sequence resumes at the termination of an interruption event.

30. The method for providing information for display to a wireless communication device of claim 28, comprising the step of providing a display sequence so that:
  the at least one display message is not displayed when the wireless communication device is off;
  the display sequence resumes with the next specified display message upon activation of the wireless communication device; and
  after the last display message of a display sequence is played, the display sequence repeats with the first specified display message.

31. The method for providing information for display to a wireless communication device of claim 28, including displaying the information in at least one of an audio form and a visual form.

32. A method for providing information for display to a wireless communication device, comprising the steps of:
- creating information for display on the wireless communication device, wherein the wireless communication device includes memory for storing information and a display;
- recording the information onto a recording medium;
- transferring the information from the recording medium to a database, wherein the database is in communication with a wireless communication network;
- downloading the information from the database, via the wireless communication network, into the memory of the wireless communication device according to a predetermined schedule;
- displaying the information on the display of the wireless communication device according to a specified play sequence, wherein displaying the information does not interfere with the normal use of the communication device;
- displaying the information on the display of the wireless communication device by displaying a first display message of a display sequence at power-up of the communication device and displaying a different display message of the display sequence at a subsequent power-up of the communication device for a specified period of time; and
- displaying the information on the display of the wireless communication device wherein the user has the ability to contact the provider of the displayed information.

33. The method for providing information for display to a wireless communication device of claim 32, whereby contacting the provider occurs via a phone call from the wireless communication device.

34. The method for providing information for display to a wireless communication 5 device of claim 33, whereby the phone call is made by pushing one or more buttons on the wireless communication device.

35. The method for providing information for display to a wireless communication device of claim 33, whereby the phone call is made by voice recognition by the wireless communication device.

36. The method for providing information for display to a wireless communication device of claim 33, whereby the phone call is made by touching the display in one or more locations.

37. The method for providing information for display to a wireless communication device of claim 32, whereby contacting the provider occurs by accessing a Web site from the wireless communication device.

38. The method for providing information for display to a wireless communication device of claim 37, whereby accessing the Web site is made by pushing one or more buttons on the wireless communication device.

39. The method for providing information for display to a wireless communication device of claim 37, whereby accessing the Web site is made by voice recognition by the wireless communication device.

40. The method for providing information for display to a wireless communication device of claim 37, whereby accessing the Web site is made by touching the display in one or more locations.

41. The method for providing information for display to a wireless communication device of claim 20, whereby the user has the ability to transfer or send the at least one display message to another user.

42. The method for providing information for display to a wireless communication device of claim 28, whereby the user has the ability to transfer or send the at least one display message to another user.

43. The method for providing information for display to a wireless communication device of claim 20, further comprising the step of marking the advertisement as played only after the advertisement is displayed for a specified time interval.

44. The method for providing information for display to a wireless communication device of claim 28, further comprising the step of marking the advertisement as played only after the advertisement is displayed for a specified time interval.

* * * * *